March 15, 1960 L. FLEMING 2,929,015

ELECTRICALLY VARIABLE IMPEDANCE

Filed Oct. 26, 1955

Lawrence Fleming

United States Patent Office 2,929,015

Patented Mar. 15, 1960

2,929,015

ELECTRICALLY VARIABLE IMPEDANCE

Lawrence Fleming, Falls Church, Va.

Application October 26, 1955, Serial No. 542,953

5 Claims. (Cl. 323—24)

Figures 1, 2, 3, 4, 5, 6:
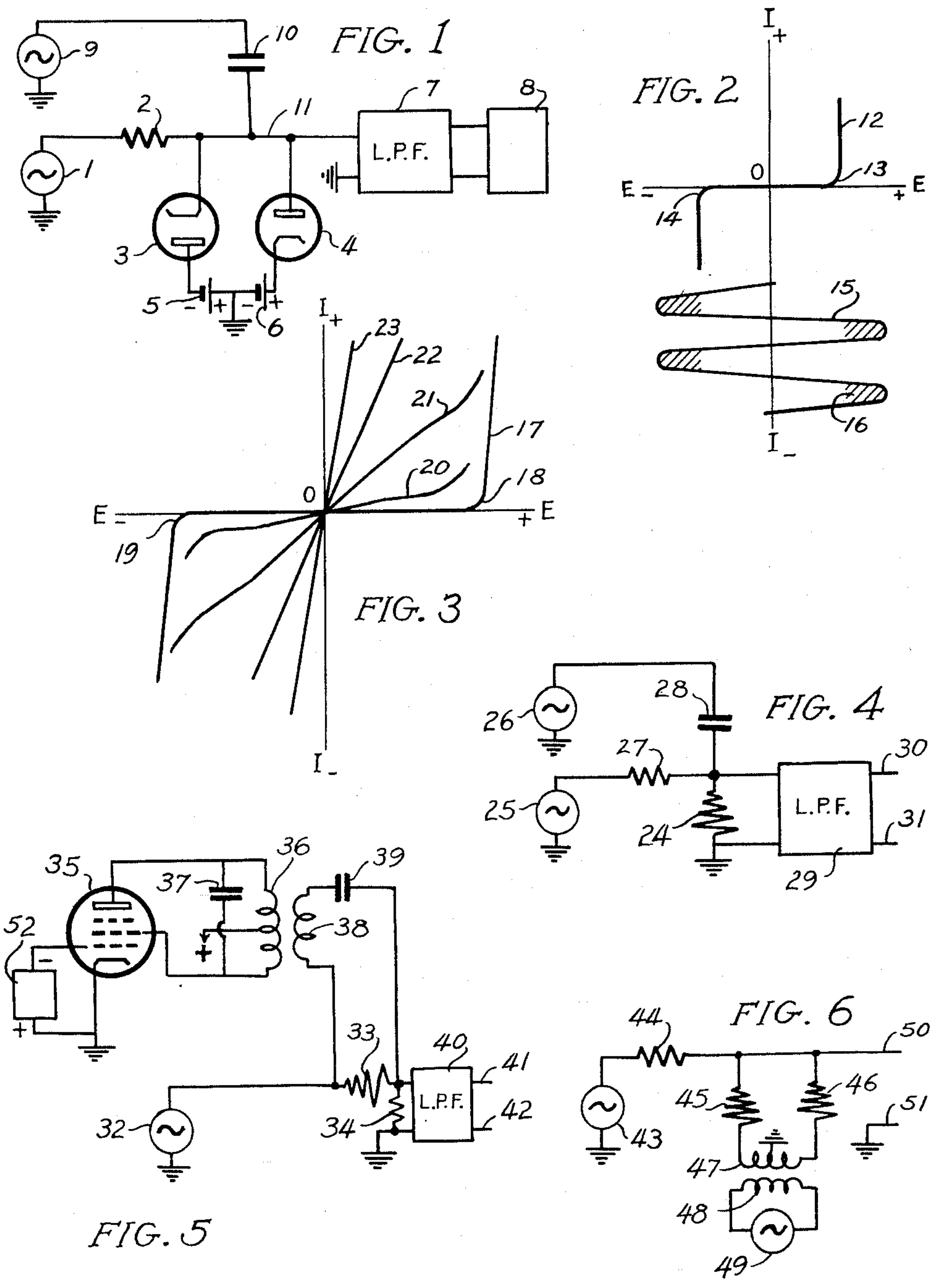

This invention relates to electrical circuits in which the effect of a variable passive impedance is produced in response to an electrical control signal, without the use of mechanically moving elements. Such circuits are useful in volume compressors and expanders, in the remote control of signal level in communication circuits, in the remote selection of signal circuits, and in the performance of switching functions, e.g. in electrical computers.

An object of the invention is to provide an electrically variable impedance which is substantially free from pedestal effects, i.e. substantially free from direct-current components in its output which vary with the control signal.

Another object is to provide an electrically variable impedance whose characteristics depend upon circuit parameters which are inherently stable, rather than upon such parameters as electron tube and diode characteristics which change with temperature and age.

The objects of the invention are accomplished generally by the process of impressing an alternating-current bias upon a symmetrical, non-linear, conducting element. This element may take the form, for example, of a pair of diodes in inverse parallel, both biased in the non-conducting direction; or of a silicon carbide varistor.

In the drawing: Fig. 1 is a circuit diagram, partly schematic and partly in block form, of a preferred embodiment of the invention; Figs. 2 and 3 are graphs illustrating the operation of the invention; Figs. 4, 5, and 6 are diagrams illustrating alternative embodiments of the invention.

In Fig. 1, a circuit according to the invention is shown for controlling the magnitude of a signal voltage transmitted from a signal source 1 to a utilization circuit 8. The source 1 could be for example a telephone line and the utilization circuit 8 a radio transmitter. In series with source 1 is an impedance 2 which may be a resistor. A connection 11 extends from impedance 2 to a low-pass filter 7, thence to the utilization circuit 8. In shunt with path 11 is a circuit consisting of two diodes 3, 4, each biased in the non-conducting direction by voltage sources shown as batteries 5 and 6.

The pair of diodes 3, 4 now constitute the shunt leg of an L-pad attenuator having as its series leg the impedance 2.

According to the invention, the effective impedance of the pair of diodes 3, 4 is varied by impressing upon it a variable auxiliary A.C. bias from a source 9, through coupling means such as a capacitor 10. The frequency of this A.C. bias is higher than that of the highest-frequency signal desired to be passed from source 1 to utilization circuit 8. For example, if ordinary audio-frequency signals are to be passed through connection 1, the bias frequency from source 9 may be between 30 kc. and 100 kc.

The bias frequency is removed from the signal path by means of a low-pass filter of any convenient type, so that it does not reach the utilization circuit 8.

Thus the signal attenuation in the network comprising impedance 2 and diodes 3, 4 is capable of being continuously varied, by varying the magnitude of the A.C. bias current (control signal) from the source 9. Alternatively, the bias current from source 9 may be fixed and the D.C. bias voltage from sources 5, 6 may be varied.

A typical relationship between the bias voltage from source 9 and the E—I characteristic of diodes 3, 4 is shown in Fig. 2. Curve 12 is an idealized relationship of current to voltage for the pair of diodes 3, 4. In the middle portion of the curve neither diode conducts, and the current is sensibly zero. Going positive from the origin, at a voltage approximately equal to the bias voltage of source 6, diode 4 will start to conduct, and the current will rise rapidly. This is point 13 on curve 12. In the negative direction, point 14 on the curve is where the other diode 3 starts to conduct, the current increasing rapidly in the negative direction as the applied voltage in that direction is increased. D.C. bias voltages from sources 5 and 6 are, for the moment, assumed to be equal, hence curve 12 is symmetrical about the origin O.

The sinusoidal wave 15 represents a few cycles of the A.C. bias current applied to the diodes 3, 4 from source 9. The diodes will conduct only during those portions of the A.C. bias cycle when the A.C. bias voltage is greater than the D.C. bias from sources 5, 6. Thus the diodes will conduct during those portions of the cycle which are shaded in the drawing, as at 16. It will be evident that the percentage of the time during which diodes 3, 4 are conducting will depend on the waveform of the A.C. bias 15, and on its magnitude relative to the D.C. "hold-off" bias from sources 5, 6.

The resulting property imparted to the pair of diodes 3, 4 is illustrated graphically in Fig. 3. This figure is a family of current-vs.-voltage curves as measured with D.C., between ground and connection 11 of Fig. 1, for various magnitudes of A.C. bias from source 9. Curve 17 shows the curve for no A.C. bias, which is similar to curve 12 of Fig. 2. Points 18 and 19 are where diodes 3 and 4 start to conduct respectively, as the applied D.C. test voltage is varied positively or negatively from zero.

Curve 20, Fig. 3, shows the voltage-current relationship of the diodes 3, 4, with a relatively small A.C. bias current from source 9. It will be noted that the curve 20 is perfectly linear through the origin O, and that it is symmetrical about the origin. Accordingly, the diodes 3, 4 with A.C. bias behave as a linear impedance for small signals, and this linear impedance does not contain any D.C. component of voltage or current.

Curves 21, 22, and 23 represent the same voltage-current relationship with successively higher values of A.C. bias current from source 9. This implies that the diodes 3, 4, are conducting for successively greater percentages of the time.

The effect of varying the A.C. bias from source 9 is, it is clear, to vary the slope of curves 17—23 without varying their position with respect to the coordinate axes E—L, I—I. Thus the impedance of diode circuit 3, 4 is varied without introducing "pedestal," i.e. direct-current components or transients. Sudden application or removal of the A.C. bias will act to perform a switching function without introducing undesired transient or pedestal voltages. Curves such as 20—23 are found, moreover, to be highly linear in the region of the origin of coordinates O, so that the impedance presented by the A.C.-biased diodes 3, 4 introduces very little distortion into the signal from source 1.

The other embodiments of the invention illustrated in

Figs. 4, 5, and 6 can now be described more briefly. In Fig. 4, the diodes 3, 4 of Fig. 1 are replaced by a silicon carbide varistor 24, a material also known by the trade name "Thyrite." This material is a symmetrical non-linear conductor having for the purpose of the invention a voltage-current characteristic substantially similar to curve 12 of Fig. 2. The difference is that the curvature is much more gradual, and the slope of the curve is not zero in the region of zero voltage. The overall effect, however, is substantially the same. In Fig. 4, the signal source is shown at 25, a series impedance at 27, the symmetrical, non-linear conducting varistor of silicon carbide or other suitable material at 24, and a low-pass filter at 29. Source 26 supplies the A.C. bias to control the effective impedance of varistor 24, through a capacitor 28. Since the frequency of the A.C. bias is relatively high, capacitor 28 can be of small enough capacitance to have negligible attenuation effect on the signal from source 25. From filter 29, leads 30 and 31 pass the controlled signal from source 25 to a utilization circuit, not shown.

The electrically-controlled impedance, when used as a variable signal attenuator, may be located either in the series leg or the shunt leg of an attenuation circuit; or such controlled impedances may be located in both legs.

Fig. 5 shows a system for the electrical control of signal transmission level according to the invention, where the symmetrical non-linear element is a silicon carbide varistor connected in the series leg, and in which a variable A.C. bias source is shown in more detailed form. In Fig. 5, the electrically controllable attenuator comprises a fixed impedance 34 and a varistor 33, to which a variable A.C. bias is applied from a controllable oscillator comprising an electron tube 35. The source of the signal voltage to be controlled is indicated as a generator 32. Following the attenuator elements 33, 34 is a low-pass filter 40 for the purpose of removing the A.C. bias from the signal, as in the embodiments previously described. Connections 41, 42 lead from the output of the low-pass filter 40 to a utilization circuit, not shown.

The controllable oscillator comprising tube 35 is of a type which provides a smooth and stable variation of A.C. oscillation amplitude in response to a relatively small variation in the D.C. bias applied to the tube grid. Tube 35 is a multi-grid tube. The control signal is applied from a source indicated in block form at 53, to the first grid of the tube. The oscillation circuit is a tuned circuit 36, 37 connected between the anode of the tube 35 and the screen or other grid located farther away from the cathode than the first grid. Coupled to the tuned circuit inductor 36 is a second inductance 38 which feeds the A.C. bias into the varistor 33 through a relatively small capacitor 39. The inductance and capacitance 38, 39, may be chosen in value so as to resonate with the frequency of oscillation of the circuit 36, 37.

For frequencies substantially lower than the A.C. bias frequency, the volt-ampere characteristic of the varistor 33 will take the same form as that shown in curves 20—23 of Fig. 3, with curve 20 representing the characteristic at low levels of A.C. bias, and curves 21—23 representing the characteristics at successively higher levels of bias current.

It is obvious that the controlled oscillator circuit 35—37 of Fig. 5 may be used as the A.C. bias source in other circuits, such as those of Figs. 1 and 4. Moreover, it is evident that any other known type of controllable A.C. source may be used for the A.C. bias source in any of the embodiments, for example a fixed-amplitude oscillator followed by a controllable-gain amplifier.

Fig. 6 illustrates an embodiment of the invention having two variable impedance elements in a balanced circuit which substantially cancels out the A.C. bias component from the output circuit and reducing or eliminating the need for a low-pass filter. The signal source is indicated at 43 and a series impedance at 44. Output leads to a utilization circuit (not shown) are shown at 50, 51. As viewed by the signal from source 43, two similar controllable impedance elements 45, 46 are connected in parallel across the signal path 50, 51. These elements 45, 46 are shown as silicon carbide varistors, but may each comprise a pair of diodes like diodes 3, 4 of Fig. 1, or any other symmetrical, non-linear conducting devices. The A.C. bias signal is applied to the two non-linear elements 45, 46 in "push-pull" from the center-tapped secondary of a transformer 47. Other known means of feeding the A.C. bias to elements 45, 46 in a balanced manner may obviously be used. Primary winding 48 is fed from a variable A.C. bias source 49.

Referring back to Fig. 2, it is found that the shape of the waveform of the A.C. bias 15 has a substantial effect on the operation of the system. Assuming that the non-linear conducting elements 3, 4 (Fig. 1) or 24 (Fig. 2), for example, is truly symmetrical about the zero axis, then the A.C. bias waveform should also be symmetrical, i.e. it should not contain substantial even-order harmonic components. Asymmetry of the A.C. bias wave will lead to displacement of the characteristic E—I curves 20—23 (Fig. 3) from their symmetrical position. This results in the introduction of a D.C. or pedestal component in the output, varying in magnitude with the magnitude of the A.C. bias. Additionally, it is found that if the wave shape 15 is triangular, the most linear relation is obtained between the A.C. bias current and the resulting magnitude of the controlled impedance. On the other hand, if the circuits of Figs. 1, 4, or 6, for example are being used for "on-off" switching purposes, the best waveform for the A.C. bias is a square wave.

The internal impedance of the A.C. bias source 9 has some effect on the relation of bias current vs. magnitude of the controlled impedance, but substantially less than the effect of waveform.

It will be seen that the overall characteristics of the electrically controllable impedances disclosed above depend primarily upon the following circuit parameters: A.C. bias current and waveform; A.C. bias source impedance; D.C. bias on diodes or alternatively the volt-ampere characteristics of varistors used; magnitude of other series or shunt impedances used in conjunction with controllable impedance elements. On the other hand, the overall characteristics do not depend appreciably upon the nature and shape of the curved portion of any diode characteristics in the region where conduction begins, e.g. regions 13, 14 (Fig. 2) or 18, 19 (Fig. 3), since the diodes are operated essentially in "on-off" fashion. This is an important advantage, since the curved portions of the E—I characteristic of any diode, be it thermionic or semi-conductor, varies considerably with age, temperature, and processing during manufacture, and cannot be considered a highly stable quantity. Similarly, the overall characteristics of the circuits of this invention do not depend upon the transfer characteristics of thermionic tubes, another kind of quantity which is affected by age, cathode temperature, gas, and other factors, and so cannot be considered satisfactorily stable for critical use.

Thus it is seen that the present invention provides an electrically variable impedance of simple construction, having high inherent stability and freedom from pedestal effects compared to other devices heretofore known to the art.

I claim:

1. In combination, a source of electrical signals of known signal level and restricted signal frequency range, an electrically variable attenuator for said signals, a filter, and a utilization circuit for said signals, said attenuator comprising a fixed series resistor and a variable shunt element, said element comprising a pair of diodes in inverse parallel, a direct-current source connected to bias said diodes away from conduction and a control generator of continuous-wave oscillations of relatively high level and of control frequency high compared to said signal frequency range, a path coupling said oscillations to said shunt element, and continuous control means to control the level of said oscillations, whereby the attenuation of said signals is made a continuous analog function of the setting of said control means, said filter being connected to pass the said signal frequency range on to said utilization circuit and to reject said control frequency.

2. Apparatus as defined in claim 1, wherein said path is a single capacitive connection.

3. Apparatus as defined in claim 1 wherein said continuous-wave oscillations are of triangular waveform.

4. In combination, a source of electrical signals of known signal level and restricted frequency range, an electrically variable attenuator for said signals, a filter, and a utilization circuit for said signals, serially connected, said attenuator comprising series and shunt resistive legs connected in an L-configuration, at least one of said legs comprising a symmetrical non-linear conducting element and a continuous-wave generator of control oscillations having a control frequency high compared to said frequency range and having an external control source connected for continuous variation of the power level of said oscillations, and coupling connections between said generator and said element to cause the average resistance of said element in said signal frequency range to vary in continuous analog fashion in response to said control source, said filter having the property of passing said signal frequency range and rejecting said control frequency.

5. Apparatus as defined by claim 4 wherein said control oscillations are of triangular waveform.

References Cited in the file of this patent

UNITED STATES PATENTS

| | | |
|---|---|---|
| 1,711,636 | Eaves | May 7, 1929 |
| 2,299,945 | Wendt | Oct. 27, 1942 |
| 2,439,651 | Dome | Apr. 13, 1948 |
| 2,487,697 | Conviser | Nov. 8, 1949 |
| 2,577,543 | Saad | Dec. 4, 1951 |
| 2,597,796 | Hindall | May 20, 1952 |
| 2,600,172 | St. John | June 10, 1952 |
| 2,730,632 | Curtis | Jan. 10, 1956 |
| 2,772,388 | Erath et al. | Nov. 27, 1956 |
| 2,792,496 | Rhodes | May 14, 1957 |
| 2,841,707 | McCulley | July 1, 1958 |